United States Patent [19]

Hüschelrath

[11] Patent Number: 4,665,751
[45] Date of Patent: May 19, 1987

[54] METHOD FOR MEASURING THE WALL THICKNESSES OF BODIES BY MEANS OF ULTRASONIC PULSES AND DEVICES FOR APPLYING THE METHOD

[75] Inventor: Gerhard Hüschelrath, Laufach, Fed. Rep. of Germany

[73] Assignee: NUKEM GmbH, Hanau, Fed. Rep. of Germany

[21] Appl. No.: 778,514

[22] Filed: Sep. 20, 1985

[30] Foreign Application Priority Data

Oct. 1, 1984 [DE] Fed. Rep. of Germany ....... 3435989

[51] Int. Cl.⁴ ............................................. G01N 29/00
[52] U.S. Cl. .......................................... 73/611; 73/597
[58] Field of Search ........................... 73/611, 616, 597

[56] References Cited

U.S. PATENT DOCUMENTS

| 3,748,895 | 7/1973 | Kummer et al. | 73/611 |
| 4,068,524 | 1/1978 | Lewis et al. | 73/611 |
| 4,261,367 | 4/1981 | Freese | 73/611 |

OTHER PUBLICATIONS

J. Krautkramer, H. Krautkramer; "Werkstoffprufung mit Ultraschall", 4th edition, Spring Verlag, Berlin/-Heidelberg/New York pp. 191–195.

Primary Examiner—Anthony V. Ciarlante
Attorney, Agent, or Firm—Cushman, Darby & Cushman

[57] ABSTRACT

The invention relates to a method and a device for measuring the wall thickness of bodies by means of ultrasonic pulses. The ultrasonic pulses are created in the bodies and reflected on the walls. The transit times of the ultrasonic pulses reflected on the walls are measured. The wall thickness is determined from the transit times by considering the respective sonic speed in the body. The measured signals obtained with a receiver are each compared with a threshold value that is set to a low base value (17a) at the beginning of the measurement. With each measured signal exceeding the associated threshold value (17a, 17b, 17c, 17d respectively) the threshold value is reset to the amplitude of the measured signal. The times from a specified starting time are measured up to the measured pulses that exceed the threshold values. The maximum value of the time corresponds to the transit time of the back wall echo (13).

11 Claims, 4 Drawing Figures

METHOD FOR MEASURING THE WALL THICKNESSES OF BODIES BY MEANS OF ULTRASONIC PULSES AND DEVICES FOR APPLYING THE METHOD

BACKGROUND OF THE INVENTION

The invention relates to a method for measuring the wall thicknesses of bodies by means of ultrasonic pulses that are produced in the bodies and reflected on the walls, the transit times of the ultrasonic pulses reflected on the walls being measured and the wall thickness determined from the transit times via the sonic speed in the respective body.

It is well known that ultrasonic pulses can be generated in bodies with an ultrasonic transmitter that propagate from one side of the body until they encounter the back wall from which they are reflected. The reflected ultrasonic pulses pass through the body again and are recorded with a receiver test head which converts them into electrical signals. The electrical signals are processed further in order to determine the wall thickness (J. Krautkrämer, H. Krautkrämer: "Werkstoffprüfung mit Ultraschall", 4th edition, Springer Verlag, Berlin/Heidelberg/New York, Pages 191-195). The signals reflected from the back walls are also known as back wall echos.

Only those received ultrasonic signals are evaluated that are present within specified time gates. The beginning of the time gate depends on the time at which the ultrasonic pulses are generated in the body to be tested. The end of the time gate can be set after matching to the approximate wall thickness such that multiple echos do not occur within the time gate. The start and stop times for the time gates are triggered by signals from the transmitter and receiver respectively.

For converting electrical energy into ultrasonic vibrations, piezoelectric and other types of transducers are used. These transducers are also used in the single head mode for receiving the reflected ultrasonic pulses. When piezoelectric transducers are used there is a relatively favourable signal-to-noise ratio with respect to the received ultrasonic pulses. It is therefore possible to specify a base threshold that matches the noise and disturbance voltages and with which the received signals are compared. If the thresholds are exceeded, this information is used for determining start and stop times. In the case of materials with high attenuation of the ultrasonic waves or in the case of great wall thicknesses, depth compensation is provided, i.e. the threshold is reduced and the transit time of the ultrasonic pulses increases.

With ultrasonic transducers operating on the electrodynamic principle, the signal-to-noice ratio for the received ultrasonic pulses is less favourable than with piezoelectric transducers. Furthermore, when electrodynamic ultrasonic transducers are used, the following occurs in particular:

(a) highly dynamic behaviour of the received ultrasonic signals;
(b) high secondary lobes of the received ultrasonic signals (the secondary lobes can differ from the respective main maximum by only approx. $-10$ dB)
(c) although only transverse waves are excited by the electrodynamic method, longitudinal waves also occur (approx. $-12$ dB referred to the absolute maximum); and
(d) a relatively high attenuation occurs between the 1st and 2nd back wall echo.

OBJECTS AND SUMMARY OF THE INVENTION

The object of the invention is to further develop a method of the kind described at the outset, that makes it possible to clearly establish back wall echos even with an unfavourable signal-to-noise ratio, high dynamic characteristics of the received ultrasonic signals, low secondary lobe suppression, and simultaneous generation of longitudinal waves and transverse waves.

The object is solved in accordance with the present invention by determining automatically the transit time that belongs to the maximum echo signal received in the respective time gate. In the case of wall thickness measurement, this is the first back wall echo. By setting a corresponding time gate, it is also possible to record the second or any other backwall echo and to establish the respective transit time.

In a preferred embodiment, the base value can be set to different heights. It is therefore possible to adapt to the particular characteristics of the test equipment. The height of the base value depends above all on the noise level that may be different for various types of test heads, test frequencies, test bodies etc. It is useful to set the base value slightly above the noise level. The noise level can be established, for example, by means of an oscillascope.

In a favourable embodiment, the time value measured when a measured pulse occurs that is greater than the respective threshold value is stored and increased each time the next measured pulse occurs that exceeds the associated threshold value by the period of time that exists between the two adjacent measured pulses. With this method, only one time value need be stored each time while the time difference is established between successive measured pulses. It is therefore a relatively simple matter to establish the transit time of the back wall echo.

A device for applying the methods to be described consists of a test head connected with a threshold value detector for receiving ultrasonic signals and setting the base value of the measured signal through an input in the threshold value detector and the amplitude of the measured signal as a new threshold value through a sample and hold circuit. The threshold value detector is connected with a measuring device in which the times between two measured pulses that exceed the respective threshold values can be recorded and totalled and in which an analyser is connected in series behind the measuring equipment.

In a preferred embodiment, the measuring device has a counter whose control input is connected to the output of the threshold value detector, the input of this counter being fed with counting pulses of constant frequency, the outputs of the counter being connected to the inputs of a buffer store that can be set from an output of the threshold value detector to read in input data, and the buffer memory being followed by the analyser connected in series. In this arrangement, measurement of the transit time of the back wall echo is relatively simple.

Behind the threshold value detector, preferably two counters are connected to which counting pulses of constant frequency are applied alternately between two successive measured pulses that exceed the respective threshold values, said counters each being connected, via an adder in each case whose second input is linked with an accumulator, to the accumulator that can be controlled from the threshold value detector and which is followed by the analyser connected in series. This arrangement is particularly suitable for high processing speeds because time delays occur for reading of the counter contents when switching over to the second counter.

Another advantageous embodiment consists of the threshold value detector being linked to an integrator behind which there is a sample and hold circuit that can be controlled from the threshold value detector and which is linked to the analyser through an analogue/-digital converter. In this arrangement the transit time of the backwall echo is measured in analogue form. The design of the arrangement is very simple.

In the threshold value detector, an upper threshold value is preferably set, and if this is exceeded it is signalled with an indicating element. The upper threshold value is set to the saturation limit of the analogue components, for example, and the amplifier is connected behind the test head. A disturbance in these elements can therefore be signalled with the indicating element.

Further details, advantages and features of the invention are given in the following description of an embodiment shown diagrammatically.

DETAILED DESCRIPTION OF THE PREFERRED EMBODIMENTS

When measuring, for example, the wall thicknesses of tubes or metal sheets by the pulse echo method with ultrasonic waves, ultrasonic pulses are created in the bodies to be tested with the aid of test heads. The ultrasonic pulses reflected on the walls opposed to the test heads are received by the same or different test heads and converted to electrical signals that are supplied to amplifiers. To generate excitation pulses and to operate the test heads as well as for further processing of the measured signals received by the test heads and converted into electrical signals, electronic arrangements are used with which the measured signals are amplified and analysed in accordance with the transit time by time gates.

Figure 1:
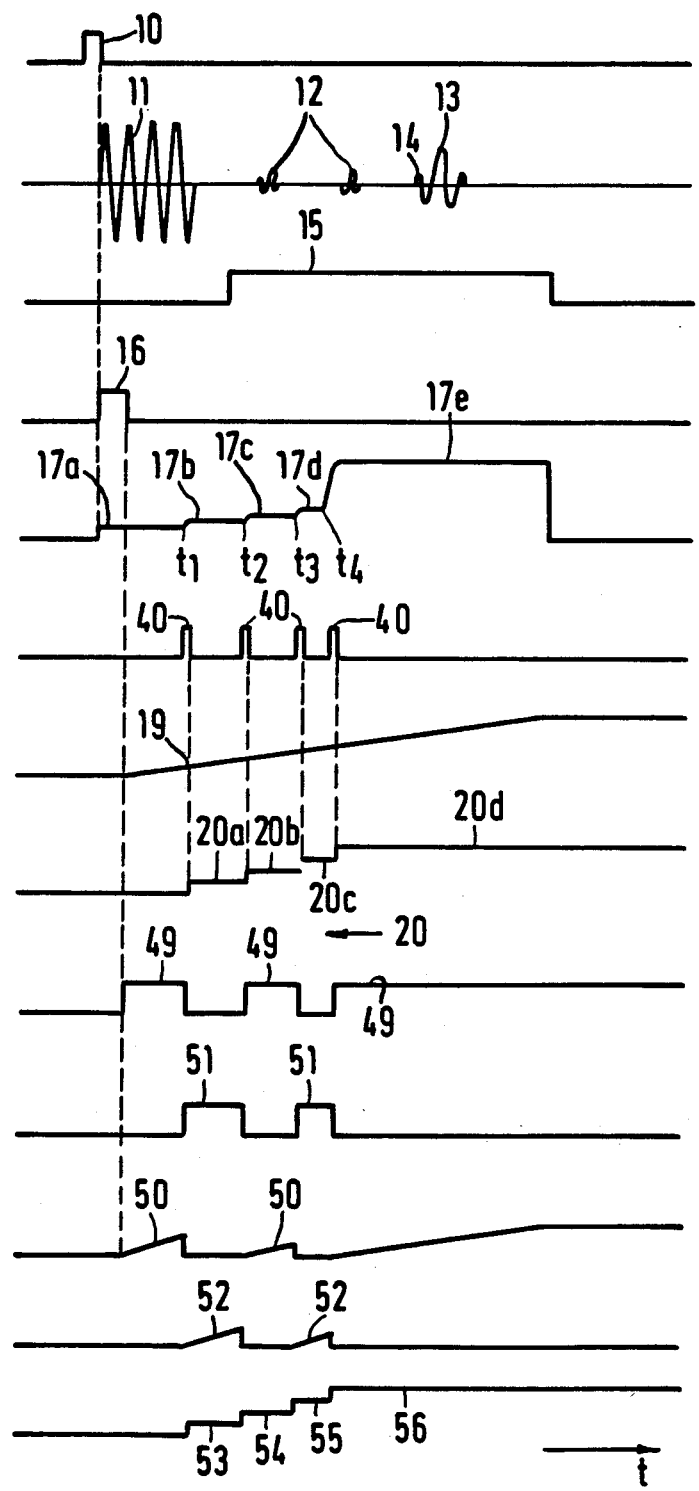
FIG. 1 is a diagram of the variation with respect to time of the signals that occur in the wall thickness measurement of bodies by the pulse echo method.

In FIG. 1, a send pulse generated by the sending test head is designated with 10. The send pulse first of all generates in the receiver an overrun with high fluctuations. The phase of the overrun of the receiver generated by the send pulse represents a dead time 11. If an electrodynamic ultrasonic transducer is used for wall thickness measurement, then not only the desired transverse waves but also longitudinal waves that cause the echo signals 12 are produced in the body to be tested. The echo signals 12 occur several times at the end of the dead time 11 and a further time delay, for example. Before the back wall echo signal 13 appears in the receiver, a pronounced premaximum 14, one of the secondary lobes of the back panel echo signal 13, occurs with electrodynamic ultrasonic transducers. In spite of the echo signals 12, the premaximum 14 and any noise signals that may exist, it is necessary to determine the transit time of the back wall echo signal 13.

In order to keep overruns, for example, away from the evaluation during the dead time 11, a time gate 15 is used within which the anticipated back wall echo signal 13 occurs, in order to contain the measuring problem. A start-calibration gate 16 defines the beginning of the measurement of the transit time of the back wall echo 13. The measurement begins, for example, with the end, i.e. the rear flank, of the start-calibration gate 16.

The received measured signals are compared with threshold values. Before the beginning of the measurement, a base value 17a is set as threshold value. The base value 17a depends on the details relating to the particular test equipment and the test body. It is selected to be somewhat higher than the noise level. It is thus below the amplitude of the echo signals 12, the premaximum 14 and the back wall echo signal 13. The base value is adjusted by the operator. The noise level is determined with an oscillascope, for example.

The base value 17a is compared with the first echo signal 12 at time $t_1$ at which the echo signal 12 is established. Since the amplitude of the echo signal 12 exceeds the base value 17a, a new threshold value 17b is specified which corresponds to the amplitude of the echo signal 12. At time $t_2$, the second echo signal 12 is compared with the threshold value 17b. Since the amplitude of the echo signal 12 exceeds the threshold value 17b, a new threshold value 17c is specified with the amplitude of the echo signal 12. The premaximum 14 is compared at time $t_3$ with the threshold value 17c. The amplitude of the premaximum 14 is greater than the threshold value 17c so that a new threshold value 17d is set that corresponds to the amplitude of the premaximum 14. After this, the back wall echo signal 13 is compared with the threshold value 17d at time $t_4$. The back wall echo signal exceeds the threshold value 17d. For this reason the amplitude of the back wall echo signal 13 is set as new threshold value 17e. Up to the end of the time gate 15 no signal occurs exceeding the back wall echo signal 13. For this reason the threshold value 17e is not changed any further.

The threshold values 17b, 17c, 17d, and 17e are then adapted to suit the respective amplitudes of the measured signals if the measured signals are greater than the preceding ones.

The measurement of the transit time commencing from the time of the rear flank of the start-calibration gate 16 is shown in FIG. 1 by a linear ramp 19. This is, for example, the time intergral. At each of the times $t_1$, $t_2$, $t_3$ and $t_4$ at which the measured signals that exceed the threshold values are established, the time measured up to the next point of time at which the measured signals exceed the associated threshold value is put into storage. The measured values at times $t_1$, $t_2$, $t_3$, and $t_4$ are shown in FIG. 1 by a step curve 20 made up of the steps 20a, 20b, 20c and 20d each of which represents a period of time. The value 20d that exists at the end of the time gate 15 is the transit time of the back wall echo signal 13. The transit time is processed further in order to determine the wall thickness. From the variation of the step curve 20, it can be seen that the stored value for the time section triggered by the start-calibration gate 16 for each measured signal that exceeds the associated threshold value increases by the value for the time section between two successive measured pulses in each case.

The measurement described above related to the absolute maximum of the measured signals within the time gate 16 permits processing of measured signals with a variation that is limited only by the noise level and the saturation boundary of the electronic processing circuit. The time gate is determined by the operator and thus adapted to the particular conditions of measurement. The measurement is therefore suitable for signals with a particularly high dynamic.

Figure 2:
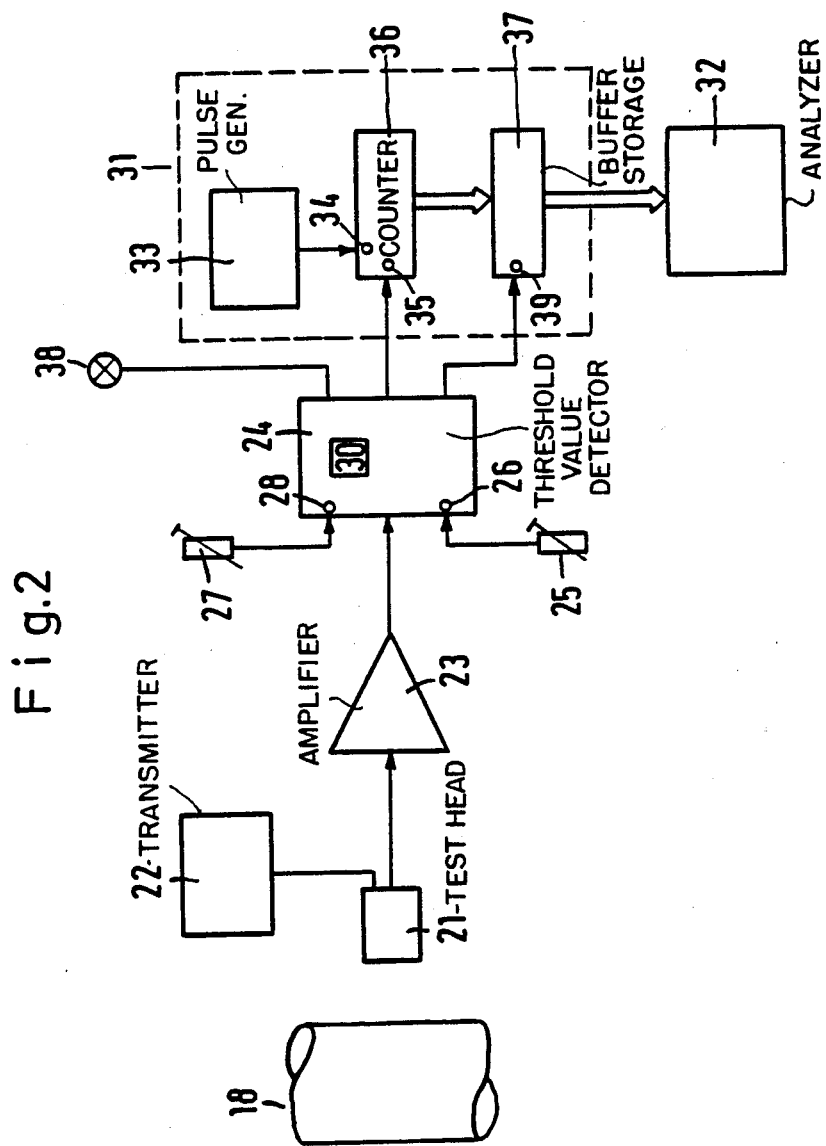
FIG. 2 is a block diagram of an arrangement for wall thickness measurement of bodies by means of ultrasonic pulses by recording of the back wall echo.

FIG. 2 shows one arrangement for measuring the wall thickness of, for example, metal sheets 18 contains a test head 21 that is used both as transmitter and as receiver for ultrasonic waves. The test head 21 operates electrodynamically. It is connected to a transmitter 22 for high frequency electrical pulses. An amplifier 23 is connected with test head 21 and followed by a threshold value detector 24.

The threshold value detector 24 has an input 26 connected to a potentiometer 25. The base value is set to the desired height with the potentiometer 25. A further input 28 of the threshold value detector 24 is connected with a potentiometer 27 that is used for setting the upper threshold value. The upper threshold value is set to the saturation limit of the electronic circuit processing the measured pulses. A sample and hold circuit 30 is arrangement in the threshold value detector 24 allowing the amplitude of the measured signals to be established provided they increase with successive measured pulses. The measured value contained in the sample and hold circuit 30 is set as a new threshold value when the threshold value detector 24 responds. A measuring device 31 is connected to the threshold value detector 24 allowing the time periods between two successive measured pulses to be recorded and totalled if the measured pulses exceed the respective threshold values. An analyser 32 is connected with the measuring device 31.

A pulse generator 33 is contained in the measuring device 31 producing counting pulses with constant frequency. The pulse generator 33 supplies pulses to the counting input 34 of a counter 36 whose control input 35 is connected with the output of the threshold value detector 24. The outputs of the counter 36 are connected with the inputs of a buffer storage 37 behind which the analyser 32 is connected. The control input 39 for reading in the signals applied to the input of the buffer memory 37 is also connected to the threshold value detector 24.

Another output of the threshold value detector 24 feeds an indicator element 38, for example a lamp, in order to indicate when the saturation limit set by regulator 27 has been exceeded.

The counter 36 is released for the counting pulses of the pulse generator 33 with the rear flank of the start-calibration gate 16 via the threshold value detector 24. The counter 36 is blocked at the end of the time gate 15. At the times $t_1$, $t_2$, $t_3$ and $t_4$ the threshold value detector 24 responds by generating short pulses 40 that are shown in FIG. 1. The pulses 40 are applied to input 39 and cause the counter reading of counter 36 to be transferred into the buffer storage. The counter reading increases in accordance with ramp 19. The steps of the step curve 20 correspond to the respective contents of buffer storage 37. The contents of buffer storage 37 at the end of the time gate 15 correspond to the transit time of the rear wall echo signal 13. At the end of the time gate 15 the measured value is transferred from the buffer storage 37 into the analyser 32 for further processing.

Figure 3:
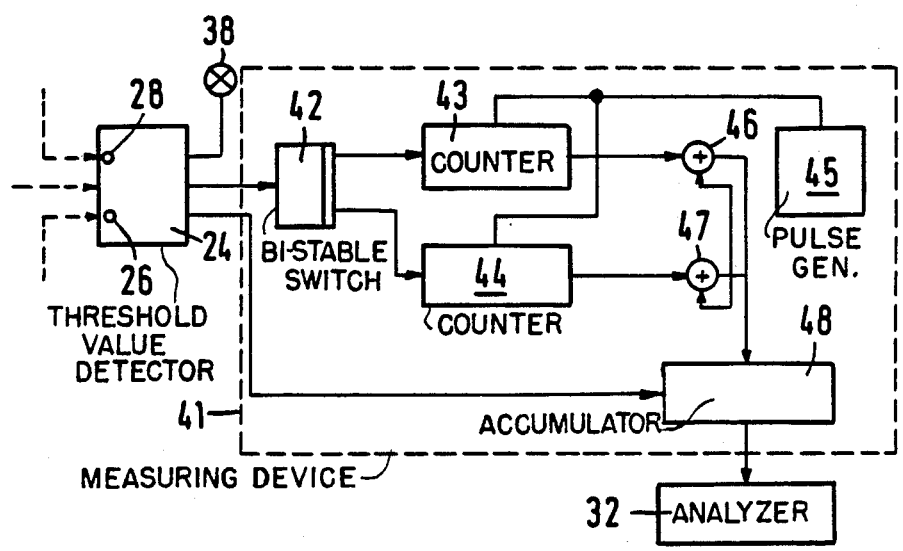
FIG. 3 is a block diagram of a second arrangement for the wall thickness measurement of bodies by means of ultrasonic pulses by the recording of the back wall echo.

In the arrangement shown in FIG. 3 the part of the circuit in front of the threshold value detector 24 corresponds to the arrangement shown in FIG. 1. For this reason only the threshold value detector 24 has been shown. The measuring device 41 in accordance with FIG. 3 has a different design from the measuring device 31. In accordance with FIG. 3, the threshold value detector 24 is followed, via a bistable switching element 42 with outputs that are antivalent to each other, by the control inputs of two counters 43, 44 whose counting inputs are fed from a pulse generator 45 that issues a sequence of counting pulses with constant frequency. The frequency can be very high. For example, the period of the counting pulses may be less than the time required for storing the data of counter 36 into the buffer storage 37. The counters 43, 44 are followed by adders 46, 47 respectively. The second inputs of adders 46, 47 are connected to the output of an accumulator 48 whose input is connected to the outputs of the adders 46, 47. The accumulator 48 is controlled by the threshold value detector 24. The accumulator 48 is followed by the analyser 32.

One of the two counters, for example counter 43, is released for the counting pulses with the start-calibration gate 16. Through switching element 42 a release signal is applied to the control input of counter 43, designated by 49 in FIG. 1. During the period of the release signal, the contents of the counter 43 increase in proportion to the period of the counting time. The increase of the contents is shown in FIG. 1 by the ramp signal 50. The threshold value detector 24 compares the first echo signal 12 with the base value 17a and generates the pulse 40 through which the release signal 49 is ended while a second release signal is applied to the control input of counter 44. The second release signal is designated with 51 in FIG. 1. The contents of counter 43 are entered into accumulator 48. The second counter 44 totals the counting pulses so that its contents increase proportionately with respect to time. This is shown in FIG. 1 by the ramp signal 52. When the second echo signal 12 is compared by the threshold value detector 24 with the threshold value 17b, the release signal 51 is ended by the second pulse 40 while the release signal 49 begins once again. The counter 43 whose contents were erased after input into the accumulator 48 totals once again counting pulses in accordance with ramp signal 50. The contents of counter 44 are added through the adder 47 to the contents 53 of accumulator 48, thus increasing the accumulator contents to the value designated by 54 in FIG. 1. When the threshold value detector 24 compares the premaximum 14 with the threshold value 17c, another pulse 40 is generated causing the release signal 49 to end and release signal 51 to begin. The counter 44 totals once again counting pulses in accordance with ramp signal 52. The contents of counter 43 are added through the adder 46 to the contents 54 of accumulator 48 thus resulting in new accumulator contents 55. When the back wall echo signal 13 is recorded, the release signal 51 ends and the release signal 49 begins. The contents of counter 44 are added to the accumulator contents 55. This results in new accumulator contents 56 corresponding to the transit time of the back wall echo signal 13. The accumulator contents 56 are transferred to the analyser 32 for further processing. The arrangement shown in FIG. 3 is also suitable for very high counting frequencies.

Figure 4:
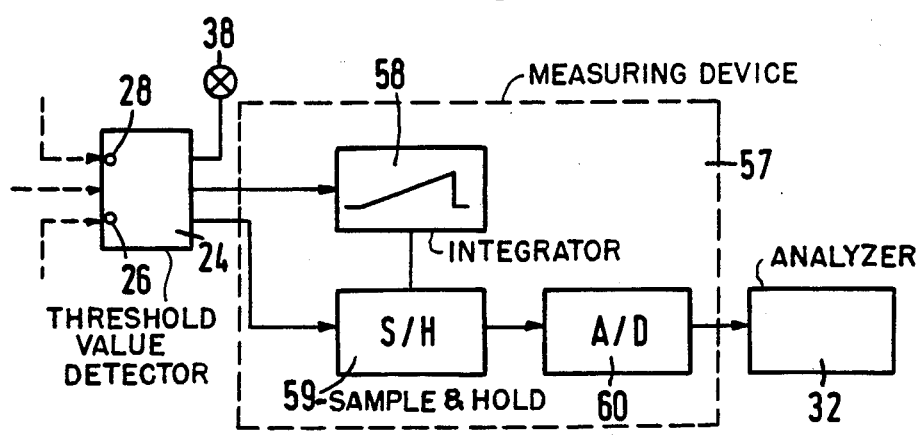
FIG. 4 is a block diagram of a further arrangement for the measurement of wall thickness of bodies by means of ultrasonic pulses by the recording of the back wall echo.

In the arrangement shown in FIG. 4 the circuit part up to the threshold value detector 24 corresponds to the arrangements in accordance with FIG. 2 and FIG. 3. This circuit part is therefore not shown separately. The arrangement in accordance with FIG. 4 contains a measuring device 57 with an integrator 58 that is connected with the threshold value detector 24. The integrator 58 is set by the start-calibration gate 16 at a constant voltage and reset at the end of time gate 15. The output of integrator 58 is connected to a sample and hold circuit 59 whose scanning time points are determined by the pulses 40 from the threshold value detector 24. The sample and hold circuit 59 feeds an analogue-to-digital converter 60 which is followed by the evaluator 32. The voltage of the integrator 58 is proportional to the transit time of the ultrasonic pulse. The value of the voltage in each case corresponds in analogue form to the contents of counter 36. The voltage of the sample and hold circuit 59 is increased in steps by the trigger pulses 40 until a voltage corresponding to the transit time of the back wall echo 13 is stored. This voltage is then converted at the end of the time gate 15 in the A/D converter 60 into a digital value that is supplied to the analyser 32.

I claim:

1. A method for measuring the wall thickness of a body comprising the steps of:
    inducing electrodynamically an ultrasonic pulse in said body at a front wall thereof;
    establishing a predetermined time interval beginning at the induction of said pulse;
    establishing an initial threshold amplitude level at a low base value as a present threshold amplitude level;
    receiving at said front wall during said predetermined time interval ultrasonic signals that have returned to said front wall after propagating through said body;
    comparing the amplitude of each received signal with the present threshold amplitude level;
    determining if the received signal amplitude exceeds the present threshold amplitude level, and if so, increasing the present threshold amplitude level to correspond to the amplitude of the received signal;
    measuring the interval of time between the induced ultrasonic pulse and the occurrence of the first increase of the present threshold amplitude level by said determining step;
    measuring each successive interval of time between each successive increase of the present threshold amplitude level by said determining step, the last occurrence of an increase of the present threshold amplitude level by said determining step indicating that the corresponding received signal is indicative of an echo of a rear wall of the body; and
    calculating the sum of said measured intervals of time, said sum indicative of the wall thickness of the body based on a predetermined velocity of propagation of the induced ultrasonic wave.

2. A method according to claim 1 wherein said establishing an initial threshold step establishes an initial threshold that is above a prevailing noise level.

3. A method according to claim 1 wherein said measuring each successive interval of time step cumulates the time interval from the inducement of the ultrasonic wave to the first increase of the present threshold amplitude level from the low base value and the time intervals between each successive increase of the present threshold amplitude level by said determining step.

4. A method according to claim 1 wherein the interval of time measured between the first occurrence of a received signal exceeding the present threshold amplitude level and the induction of the ultrasonic pulse is stored, and the stored value is increased by an amount equal to the interval of time between each subsequent occurrence of a received signal exceeding the present threshold amplitude level.

5. A device for measuring the wall thickness of a body comprising:
    means for inducing electrodynamically an ultrasonic pulse in said body at a front wall thereof;
    means for establishing a predetermined time interval beginning at the induction of said pulse;
    means for establishing an initial threshold amplitude level at a low base value as a present threshold amplitude level;
    means for receiving at said front wall during said predetermined time interval ultrasonic signals that have returned to said front wall after propagating through said body;
    means for comparing the amplitude of each received signal with the present threshold amplitude level;
    means for increasing the present threshold amplitude level to correspond to the amplitude of the received signal if the received signal amplitude exceeds the present threshold amplitude level;
    means for measuring the interval of time between the induced ultrasonic pulse and the occurrence of the first increase of the present threshold amplitude level;
    means for measuring each successive interval of time between each successive increase of the present threshold amplitude, the last occurrence of an increase of the present threshold amplitude level indicating that the corresponding received signal is indicative of an echo of a rear wall of the body; and
    means for calculating the sum of said measured intervals of time, said sum indicative of the wall thickness of the body based on a predetermined velocity of propagation of the induced ultrasonic wave.

6. A device for determining the wall thickness of a body comprising:
    means for inducing electrodynamically an ultrasonic pulse in said body at a front wall thereof;
    means for establishing a predetermined time interval from the induction of said ultrasonic wave in said body;
    a test head for receiving ultrasonic signals that have propagated through said body;
    a threshold value detector for setting an initial threshold amplitude level to a low base value and storing a current threshold amplitude level;
    a sample and hold circuit for sampling an amplitude of each signal received during said predetermined time interval and updating the current threshold amplitude level of said threshold value detector to equal the amplitude of said received signal if said amplitude of said received signal exceeds the current threshold amplitude level; and means for measuring time from the inducing of said ultrasonic wave in said body to the last updating of the current threshold amplitude level during said predetermined time interval.

7. A device as in claim 6, wherein:

said test head for receiving ultrasonic signals is connected to said threshold value detector;

said low base value is set in said threshold value detector through an input, and the amplitude of each received signal exceeding the current threshold amplitude level is set as the updated current threshold amplitude level by said sample and hold circuit;

said measuring device is connected to the threshold value detector and records and totals the intervals of time between each successive updating of the current threshold amplitude level; and the total of the intervals of time is indicative of the wall thickness of the body based on a predetermined velocity of the induced ultrasonic wave.

8. A device according to claim 7, wherein the measuring device has a counter connected by a control input to a first output of the threshold value detector, a counting input being supplied with counting pulses of constant frequency; and the output of said counter is read into a buffer storage by a second output of the threshold value detector.

9. A device according to claim 7, wherein the threshold value detector supplies a first and a second counter with counting pulses of constant frequency alternatively between successive received signals that exceed the current threshold amplitude level, said first and second counter each being connected to an accumulator controlled by said threshold value detector, said first and second counter each being connected to said accumulator through a first input of an adder whose second input is connected to the output of the accumulator.

10. A device according to claim 7, wherein the threshold value detector is connected to an integrator which is followed by a sample and hold circuit that is controlled by the threshold value detector, the output of said sample and hold circuit being connected to an analogue/digital converter.

11. A device according to claim 7, wherein an indicating element provides an indicator signal if an upper threshold value of said threshold value detector signal is exceeded.

* * * * *